United States Patent

Overby

[15] 3,639,679

[45] Feb. 1, 1972

[54] SEMICONDUCTOR MICROPHONE

[72] Inventor: Sune Lambert Overby, Stockholm, Sweden

[73] Assignee: Telefonaktiebolaget LM Ericsson, Stockholm, Sweden

[22] Filed: Jan. 13, 1970

[21] Appl. No.: 2,551

[30] Foreign Application Priority Data

Jan. 21, 1969 Sweden....................................752/69

[52] U.S. Cl. ........................................179/110 B, 317/235 M

[51] Int. Cl..........................................................H04r 23/00

[58] Field of Search.....................317/235; 179/110 B; 510/2; 307/309; 324/45; 310/DIG. 1, DIG. 4, 3 B; 181/.5 AG; 73/71.4

[56] References Cited

UNITED STATES PATENTS

| | | | |
|---|---|---|---|
| 3,264,416 | 8/1966 | Jorden et al. | 179/110.2 |
| 2,916,639 | 12/1959 | Krembs | 179/110.2 |
| 3,274,406 | 9/1966 | Summers, Jr. | 317/234/26 |
| 2,907,897 | 10/1959 | Sander | 179/110.2 |
| 3,535,626 | 10/1970 | Uemura et al. | 317/235/H |

*Primary Examiner*—Kathleen H. Claffy
*Assistant Examiner*—Thomas L. Kundert
*Attorney*—Hane & Baxley

[57] ABSTRACT

A microphone includes a permanent magnet having an airgap in which a semiconductor diode sensitive to a varying external magnetic field is suspended. The diode is connected to a sound-responsive element so that when the sound-responsive element is vibrated by acoustic waves, the diode will oscillate in the airgap of the permanent magnet so that the current through the diode will vary according to the vibrations.

5 Claims, 3 Drawing Figures

INVENTOR
SUNE LAMBERT ÖVERBY
By Hane and Baxley
ATTORNEYS

INVENTOR
SUNE LAMBERT ÖVERBY
By Hane and Baxley
ATTORNEYS

SEMICONDUCTOR MICROPHONE

This invention relates to a microphone including a semiconductor diode.

In a communications system it is desirable that the internal impedance of a microphone be smaller than or equal to the nominal impedance of the circuit connected to the microphone, because the microphone and its connections should be relatively independent of the insulation qualities in the microphone circuit. For this reason crystal-, electret-, and ferro-electrical microphones are unsuitable because they have an impedance of the same size as the insulation impedance of the system.

The present invention contemplates a microphone comprising a sound-responsive element arranged to mechanically modulate a static magnet field in a semiconductor diode, as indicated in the claims.

The invention is described with reference to the accompanying drawings.

Figure 1:
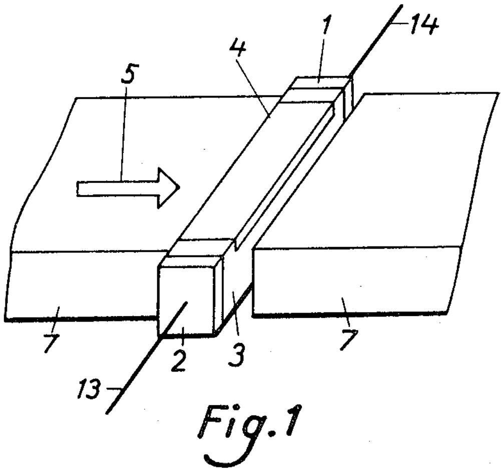
FIG. 1 shows a semiconductor diode in the airgap of a permanent magnet.

From semiconductor technology it is known that the forward current in a diode, for example of silicon or germanium, can be modulated with an external magnetic field. This modulation effect is relatively weak and cannot be exploited in a microphone with sufficient sensitivity for telephony. A later developed and related form a diode is known wherein the semiconductor structure is arranged so that a magnetic field has a much greater influence on the diode current. This later diode is shown in FIG. 1 placed in the airgap of the permanent magnet. The diode consists of a rectangular silicon or germanium crystal having a p-region 1 at one end and *n*-region 2 at the other end. Between these two regions there is a region 3, in the literature called *i*-region, of unalloyed crystal having one edge constituting a recombination region 4, covered by a thin layer of, for example copper or nickel. An external magnet field 5 is utilized to influence charge carriers, normally flow from, for example, the *p*-region 1 through the whole *i*-region 3 to the *n*-region 2, so that they are steered away into the recombination region 4 and emit their charges there. In such a manner the magnetic field can effectively influence the current through the diode.

The magnetic field is generated of a permanent magnet 7, between the two poles of which the diode is placed in a certain manner described below.

The diode is included in a microphone, consisting of a sound-responsive element such as a cone-shaped diaphragm whose sound-responsive movements mechanically modulate a static magnetic field traversing the *i*-region of the diode.

Figure 2:
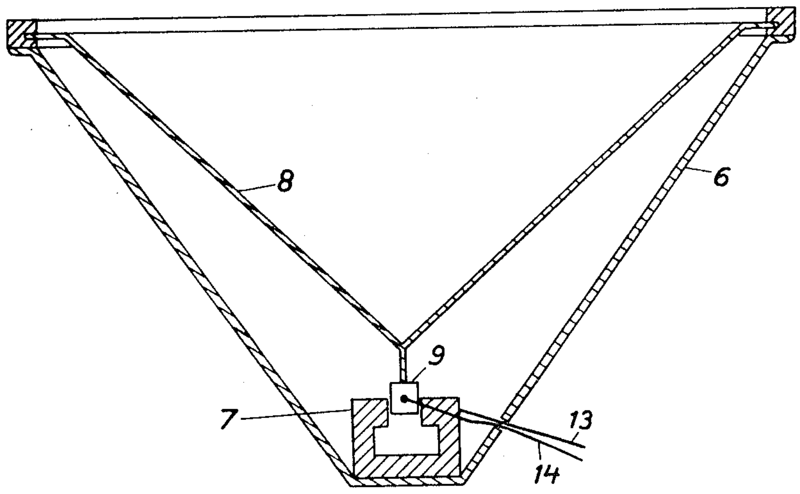
FIG. 2 shows an example of the construction of a microphone according to the invention.

The embodiment of the invention shown in FIG. 2 has a cap 6, to which is attached a permanent magnet 7 with an airgap. A sound-responsive element i.e., an element which transforms acoustic waves into mechanical oscillations, in this case a cone-shaped diaphragm 8, is movable fastened in the cap 6. At the apex of the cone there is connected a diode 9, which is sensitive to varying external magnetic fields. The diode is so-positioned in the airgap of the magnet, that the magnetic field 5 in the airgap will strike the diode as is shown in FIG. 1. When the diaphragm is vibrated by acoustic waves the diode will move up and down perpendicular to the magnetic flux lines in the airgap of the magnet and perpendicular to an axis drawn between the *p*-region and the *n*-region of the diode. The maximum amplitude of this motion should have a displacement about the same size as half the height of the airgap.

When the diaphragm and therefore the diode is at rest, the *i*-region of the diode is subjected to a part of the magnetic field since the diode then partly intercepts the airgap. If the two terminals 13 and 14 of the diode are connected in a suitable live circuit a part of the charge carriers will be steered away from the recombination region 4 the influence of the magnetic field so that the current through the diode has a certain (average) value. When the diaphragm is subjected to acoustic waves and responds by vibrating the diode moves in a direction transverse to the magnetic field. Thus, the magnetic field through the *i*-region of the diode is less when the diode withdraws from the airgap and a diminishing number of charge carriers are steered away from the recombination region 4. Hence, the current through the diode increases. When the diode on the other hand by the influence of the diaphragm moves from the rest position deeper into the airgap of the magnet, an increased part of the current carriers will be steered away from the recombination region and the current through the diode decreases. This effect can also be explained by the fact that the internal resistance of the diode is a function of the magnetic field through the *i*-region of the diode which is dependent in turn on the relative positions of the diode and the magnet. The blocking capacity of the diode in the reverse direction remains uninfluenced by the magnetic field.

It is more suitable to attach the semiconductor diode instead of the magnet to the sound responsive element since the diode in general is easier to move than the permanent magnet.

In order to obtain a large current variation for the motion of the semiconductor diode relative to the magnetic field, the diode should have its rest position only partly be in the airgap. The diode can rest be placed either so that for a certain direction of motion of the sound-absorbing element it has a relative motion out of the airgap of the permanent magnet or so that it has a relative motion into the airgap.

In certain cases it may be necessary to connect the microphone to a following amplifier in order to increase the amplitude or change the impedance.

Figure 3:
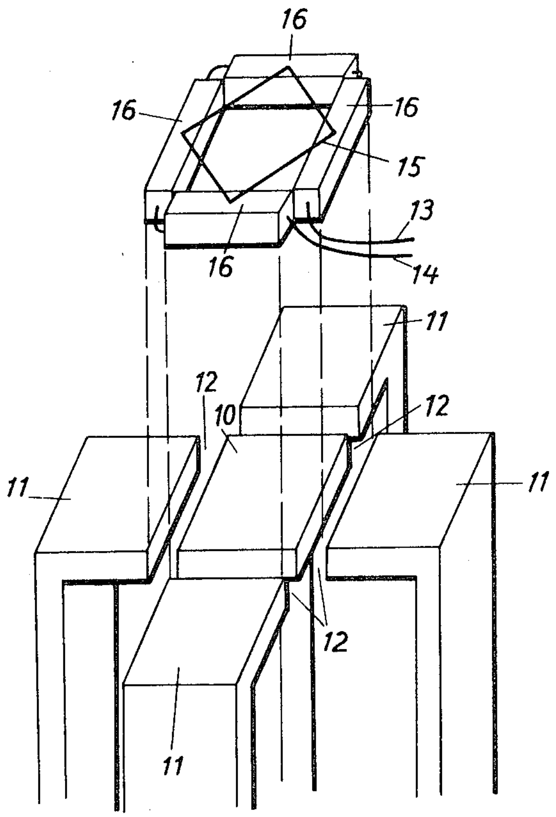
FIG. 3 shows in an exploded view an example of an arrangement with several semiconductor diodes.

In order to increase the sensibility of the microphone the permanent magnet can for example be formed as is shown in FIG. 3. The magnet than has a central pole 10 and two or more part poles 11 of opposite polarity, arranged around the central pole in one plane, so that airgaps 12 are established between the part poles 11 and the central pole 10. In each of these there is placed one external magnetic fields sensible semiconductor diode 16 in the above-mentioned manner according to FIG. 1. These diodes are mechanically attached to each other as is schematically indicated by the line 15. Electrically they can be connected in parallel or, as in FIG. 3, in series dependent on what is most suitable for the arrangement. The diodes which are mechanically attached to each other are also connected to a diaphragm.

I claim:

1. A microphone comprising source means for establishing a constant magnetic field within a given region wherein the magnetic lines of flux cross the region in a given direction, at least one semiconductor diode having a longitudinal axis, one end of said semiconductor diode having a *p*-region, the other end of said semiconductor diode having an *n*-region, and the portion of said semiconductor diode between said ends having an *i*-region, said *i*-region having at least one edge parallel to said longitudinal axis and having a recombination region, signal terminals connected to said *p*- and *n*-regions whereby current can flow longitudinally between said *p*- and *n*-regions, means for supporting said semiconductor diode at least partially in said given region with said longitudinal axis substantially orthogonal to the magnetic lines of flux, and means responsive to acoustic waves by vibrating for generating relative movement between said semiconductor diode and said source means in a direction substantially orthogonal to said longitudinal axis and the magnetic lines of flux.

2. The microphone of claim 1 wherein said source means is a permanent magnet with an airgap defining said given region and said means responsive to acoustic waves is a diaphragm connected to said semiconductor diode.

3. The microphone of claim 1 wherein said source means is a permanent magnet with an airgap defining said given region and said means responsive to acoustic waves is a diaphragm connected to said permanent magnet.

4. The microphone of claim 1 wherein said source means is a permanent magnet having a central pole and at least two part poles of opposite polarity disposed about said central pole in one plane whereby airgaps are established between said part poles and said central pole, and a semiconductor diode positioned in each of said airgaps, said semiconductor diodes being mechanically and electrically interconnected to enhance signals generated in response to acoustic waves.

5. A microphone comprising a permanent magnet, said permanent magnet having a central pole and at least two part poles of opposite polarity arranged around said central pole in one plane, a *p-i*-n-diode at least partially in each airgap, each *p-i-n*-diode having a *p*-region at one end, an *n*-region at the other end and an *i*-region intermediate said ends, said *i*-region having an edge provided with a recombination region, a diaphragm for generating relative movement between said permanent magnet and said *p-i-n*-diodes, and means for mechanically and electrically connecting said *p-i*-n-diodes to enhance electrical signal generation.

* * * * *